United States Patent
Nordstrom et al.

(10) Patent No.: US 7,360,271 B2
(45) Date of Patent: Apr. 22, 2008

(54) APPARATUS FOR CLEANING A MACHINE TOOL

(75) Inventors: George Nordstrom, Sterling Heights, MI (US); David Bednarek, Novi, MI (US); Alexander Stoll, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 171 days.

(21) Appl. No.: 10/707,875

(22) Filed: Jan. 20, 2004

(65) Prior Publication Data

US 2005/0155626 A1 Jul. 21, 2005

(51) Int. Cl.
*B08B 1/00* (2006.01)
*B23Q 11/02* (2006.01)

(52) U.S. Cl. .................. 15/246; 15/256.52; 15/104.09; 15/104.05; 409/137; 408/67

(58) Field of Classification Search .................. 15/246, 15/246.5, 256.5, 256.52, 88, 104.03, 104.05, 15/104.09, 104.095; 409/134, 137; 408/67
See application file for complete search history.

(56) References Cited

U.S. PATENT DOCUMENTS

| | | | |
|---|---|---|---|
| 2,619,009 A | 11/1952 | Begle | |
| 3,435,479 A | 4/1969 | Gibson, Sr. | |
| 3,603,125 A | 9/1971 | Edwards | |
| 3,852,923 A * | 12/1974 | Hess | 451/484 |
| 4,422,200 A | 12/1983 | Atwater | |
| 5,168,660 A * | 12/1992 | Smith | 451/462 |
| 5,895,182 A | 4/1999 | Hayashi et al. | |
| 5,964,003 A * | 10/1999 | Rogers | 15/98 |
| 6,210,261 B1 * | 4/2001 | Johnson | 451/451 |
| 6,409,641 B1 | 6/2002 | Hashimoto | |
| 6,467,121 B1 * | 10/2002 | Franzino et al. | 15/104.09 |
| 6,776,698 B2 * | 8/2004 | Pepin et al. | 451/434 |
| 6,839,930 B1 * | 1/2005 | Shelton | 15/104.05 |
| 2001/0040017 A1 * | 11/2001 | Gustafson | 164/17 |

FOREIGN PATENT DOCUMENTS

| | | |
|---|---|---|
| DE | 33 20 598 A1 | 12/1984 |
| DE | 4012314 | 11/1991 |
| DE | 42 06 587 A1 | 9/1993 |
| EP | 1179388 | 2/2002 |

OTHER PUBLICATIONS

Var.-Speed MultiPro Kit w/Flex-Shaft☐☐http://web.archive.org/web/20030222112038/www.dremel.com/productsdisplay/tool...☐☐☐☐.*

(Continued)

*Primary Examiner*—Shay L Karls
(74) *Attorney, Agent, or Firm*—Raymond Coppiellie; Brooks Kushman P.C.

(57) ABSTRACT

An apparatus and a method for dislodging contaminants from a surface of a machine tool. A machine tool has a spindle and a housing disposed around the spindle. The apparatus includes a support plate, an arbor, and a cleaning member. The arbor is disposed on the support plate and is adapted to be attached to the spindle. The cleaning member is disposed on and extends from the support plate. The cleaning member contacts a surface of the machine tool to remove contaminants.

20 Claims, 3 Drawing Sheets

OTHER PUBLICATIONS

Flex-Shaft Attachment□□http://web.archive.org/web/20021017223328/www.dremel.com/productsdisplay/att_t...□□.*

Rubber Polish. Point□□http://web.archive.org/web/20030626024123/www.dremel.com/productsdisplay/bit_t..□□.*

Cleaning/Polishing bits□□http://www.dremel.com/HTML/products/accessoires/cleaning.html□□.*

BIG Kaiser Precision Tooling, Lang Chip Removal Fans, 2003, www.bigkaiser.com/lng.htm.*

Cleaning/Polishing bits, www.dremel.com/HTML/products/accessories/cleaning.html. Dec. 14, 2005, p. 1 of 3.*

Bristle Brush, www.dremel.com/HTML/images/products/bits/large/403.gif. Dec. 15, 2005, p. 1 of 1□□.*

Dremel Kit, www.web.archive.org/web/20040401205625/www.dremel.com/html/images/produ... Dec. 15, 2005, p. 1 of 1.*

Planar. www.dictionary.reference.com/browse/planar. Sep. 13, 2007.*

Planar Curve. www.2dcurves.com/definition.html. Sep. 13, 2007.*

* cited by examiner

APPARATUS FOR CLEANING A MACHINE TOOL

BACKGROUND OF INVENTION

1. Field of the Invention

The present invention relates to an apparatus and a method for removing contaminants from a surface of a machine tool, and more particularly to a cleaning apparatus that is selectively coupled to and movable by a machine tool spindle.

2. Background Art

Machine tools can perform a variety of operations to shape and finish a part. When these operations are performed, contaminants such as chips, dust, and lubricants are dispersed onto the surfaces of the machine tool. These contaminants must be periodically removed to maintain the stability and quality of the machining process.

Previously, operators cleaned machine tools by spraying air or coolant against contaminated surfaces to dislodge particulates. These manual operations were messy, time consuming, labor intensive, and resulted in increased machine downtime and associated costs.

Before applicant's invention, there was a need for an apparatus and a method for efficiently cleaning a machine tool without extensive operator involvement. In addition, there was a need for an apparatus that could be automatically selected and attached to the machine tool to reduce machine downtime and associated costs. Problems associated with the prior art as noted above and other problems are addressed by applicant's invention as summarized below.

SUMMARY OF INVENTION

According to one aspect of the invention, an apparatus for dislodging contaminants from a surface of a machine tool is provided. The machine tool includes a spindle and a housing. The spindle is adapted to turn about an axis of rotation. The housing is disposed around and spaced apart from the spindle. The apparatus includes a support plate, an arbor, and a cleaning member. The arbor is disposed on the support plate and is adapted to be attached to the spindle. The cleaning member is disposed on and extends from the support plate. The cleaning member contacts a surface of the machine tool to remove contaminants.

According to another aspect of the invention, an apparatus for dislodging surface contaminants from a machine tool is provided. The apparatus includes a fixture, a support plate, a first coupling member, and a cleaning member. The fixture is secured to the machine tool in a stationary position. The support plate is rotatably mounted on the fixture. The first coupling member is disposed on the support plate and is adapted to engage a second coupling member disposed on the spindle. The cleaning member is disposed on and extends from the support plate. When the first and second coupling members are engaged, the spindle rotates the support plate about the axis of rotation and the cleaning member contacts a surface of the machine tool to remove contaminants.

The cleaning member may be a plurality of flexible bristles or a flexible wiper. The cleaning member may be disposed along an inside edge of the support plate for cleaning an exterior surface of the spindle and/or along an outside edge of the support plate for cleaning an interior surface of the housing. The cleaning member may be disposed radially about the axis of rotation or at an angle relative to the support plate.

The apparatus may include a conduit disposed on the support plate. The conduit may be connected to a source of pressurized fluid and may have an aperture for discharging pressurized fluid toward the machine tool to remove contaminants.

According to another aspect of the invention, a method for removing contaminants from a surface of a machine tool with a cleaning apparatus is provided. The method includes the steps of coupling the cleaning apparatus to the spindle such that the cleaning apparatus may rotate about the axis of rotation and moving the spindle so that a cleaning member contacts a surface of the machine tool and removes contaminants.

The step of coupling the cleaning apparatus to the spindle may include advancing the spindle along the axis of rotation to engage the cleaning apparatus. The step of coupling the cleaning apparatus to the spindle may include positioning the cleaning apparatus adjacent to the spindle with an automated tool change mechanism before coupling the cleaning apparatus to the spindle.

The step of moving the spindle may include rotating the spindle about the axis of rotation to cause the cleaning apparatus to rotate. The step of moving the spindle may include rotating the spindle to a predetermined position, locking the spindle so that it cannot rotate about the axis of rotation, and repositioning the spindle along an axis perpendicular to the axis of rotation so that the cleaning member slidingly contacts an interior surface of the housing to remove contaminants.

DETAILED DESCRIPTION

Figure 1:
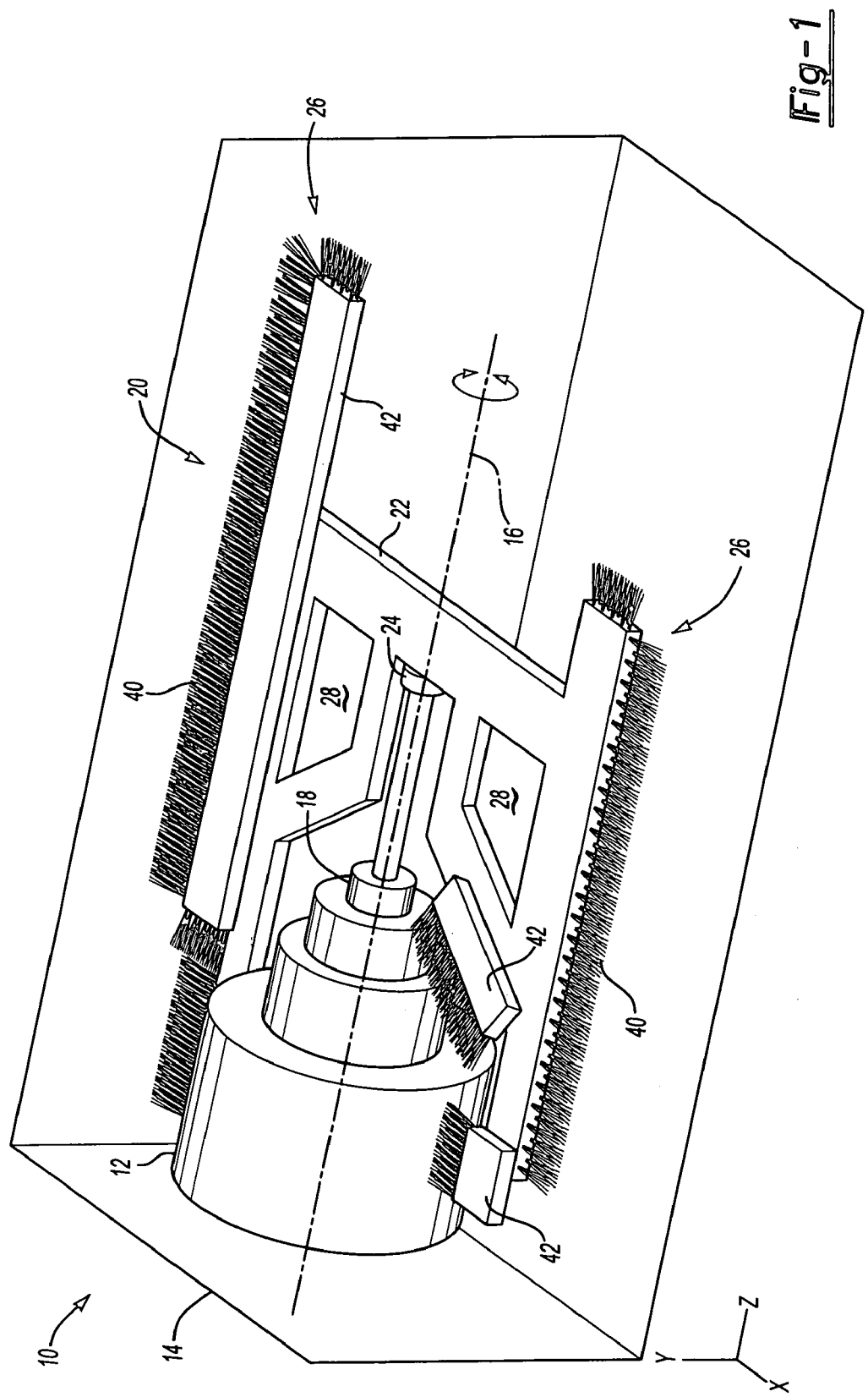
FIG. 1 is a perspective view of a machine tool and a cleaning apparatus.

Referring to FIG. 1, a machine tool 10 is shown. The machine tool 10 may be of any suitable type, such as a computer numerical control (CNC) machine tool, press, or assembly device. In addition, the machine tool 10 may be configured to perform any suitable shaping or finishing operation, such as cutting, shaving, turning, boring, drilling, grinding, reaming, deburring, tapping, forming, milling or polishing.

In the embodiment shown in FIG. 1, the machine tool 10 includes a spindle 12 and a housing 14. The spindle 12 is adapted to rotate about an axis of rotation 16 in a clockwise or counterclockwise direction as denoted by the curved arrow. The spindle 12 may be turned by a motor (not shown) at any suitable speed. In addition, the machine tool 10 may be configured to move the spindle 12 along different axes, such as X, Y, and/or Z axes as shown in the embodiment in FIG. 1, in a manner known by those skilled in the art.

The housing 14 includes a plurality of panels disposed around and spaced apart from the spindle 12. The housing 14 may have any suitable configuration and may include doors and/or windows. The housing 14 may be made of any suitable material, such as sheet metal. The housing 14 prevents contaminants, such as chips, dust, lubricants, and oil mist, from escaping to the surrounding environment.

Figure 2:
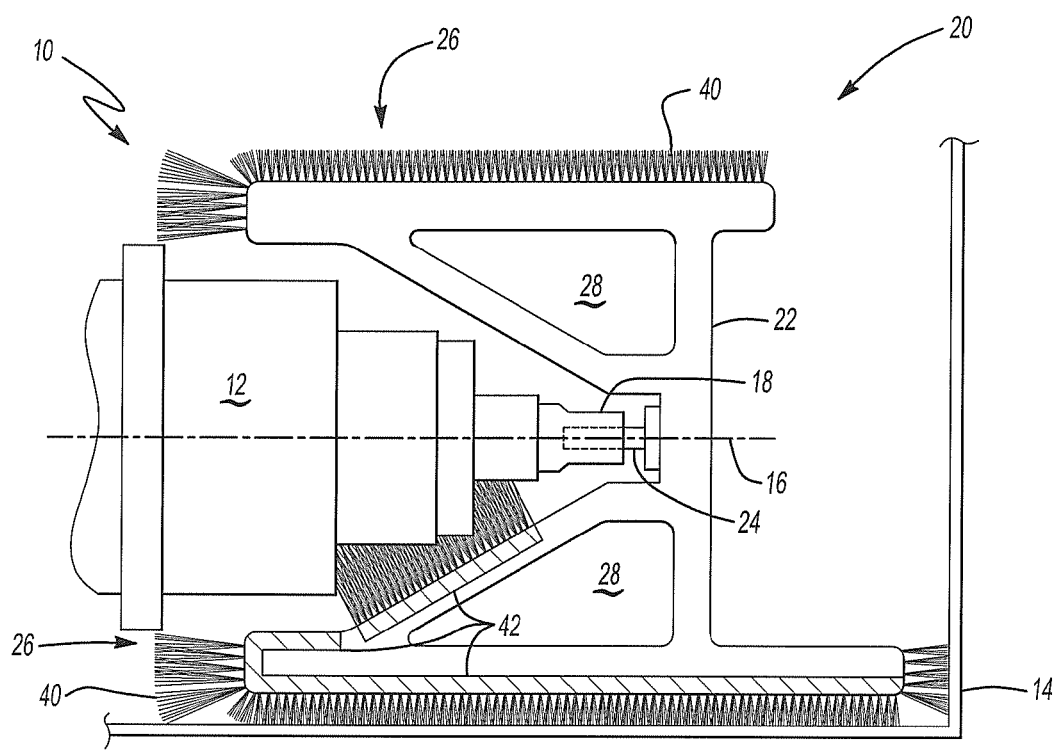
FIG. 2 is a side view of one embodiment of the cleaning apparatus mounted on a spindle.

Referring to FIGS. 1 and 2, a tool holder or first coupling member 18 may be disposed on the spindle 12. The first coupling member 18 is used to selectively attach tools and other components to the spindle 12 and may have any suitable configuration. For example, the first coupling member 18 may be a friction coupling or a quick connect coupling. In the embodiment shown in FIG. 2, the first coupling member 18 is a female coupling disposed along the axis of rotation 16.

A cleaning apparatus 20 may be selectively attached to the spindle 12. The cleaning apparatus 20 includes a carrier or support plate 22, a second coupling member 24, and a cleaning member 26.

The support plate 22 may have any suitable configuration and may have a symmetric or asymmetric design. In the embodiment shown in FIGS. 1 and 2, the support plate 22 is generally planar and has an asymmetric shape. The support plate 22 may include openings 28 to reduce the weight and rotational inertia of the cleaning apparatus 20 and to reduce loading on the spindle 12. The support plate 22 may be made of any suitable material, such as a metal or a polymeric material.

Optionally, the cleaning apparatus 20 may include multiple support plates disposed at any suitable angle relative to each other. For instance, two support plates may be disposed perpendicular to each other in a cross configuration.

The second coupling member 24 selectively engages the first coupling member 18 to facilitate attachment of components to the spindle 12. The second coupling member 24 may be of any suitable type and have any suitable configuration. In the embodiment shown in FIG. 2, the second coupling member 24 is a cylindrical shaft or arbor that is inserted into the first coupling member 18 or an aperture in spindle 12 and secured with a fastener, such as a set screw (not shown). The second coupling member 24 may be made of any suitable material, such as a metal or polymeric material.

The cleaning apparatus 20 may be manually or automatically positioned and coupled. For example, the cleaning apparatus 20 may be selectively positioned by a robot or a tool change mechanism, such as an automated tool changer. The cleaning apparatus 20 may be stored in the machining envelope of the machine tool 10 or apart from the machine tool 10.

One or more cleaning members 26 may be disposed on the support plate 22. The cleaning member(s) 26 may be of any suitable type, such as a brush, bristles, wiper, or flap made of a woven or lofted material. In addition, different types of cleaning members may be used in any combination. The cleaning member 26 may be used to displace contaminants from any suitable surface of the machine tool 10, including the spindle 12, housing 14, coupling members 18, 24, part holding fixtures, and/or material handling pallets. Optionally, the cleaning apparatus 20 may include a cutting tool in combination with the cleaning member 26.

Referring to FIG. 2, one embodiment of a cleaning apparatus 20 is shown. In this embodiment, the cleaning member 26 is a plurality of flexible bristles 40.

The bristles 40 may be made of any suitable material, such as a polymeric material like nylon or a metal like brass. The bristles 40 may have any suitable configuration. For example, multiple rows and/or lengths of bristles 40 may be employed. The rows may be configured in any suitable pattern, including linear, curved, spiral, and/or serpentine patterns. In addition, the bristles 40 may be positioned at any suitable angle or orientation. For example, the bristles may be oriented parallel to the support plate 22 as shown in FIG. 2. The bristles 40 may be coated or uncoated and may have various tip designs. For example, the tips of the bristles 40 may be flat, angled, pointed, or rounded.

The bristles 40 may be connected to the support plate 22 in any suitable manner. For instance, the bristles 40 may be disposed in holes formed in the support member 22. Alternately, the bristles 40 may be disposed in a mounting block 42 that is attached to the support plate 22 as shown in FIG. 2. The mounting block 42 may be removably and/or adjustably connected to the support plate 22 with fasteners. Optionally, the bristles 40 and/or mounting block 42 may be spring loaded or mounted on a flexible member to allow the bristles 40 and/or mounting block 42 to move and follow the contour of the surface contacted by the bristles 40.

Figure 3:
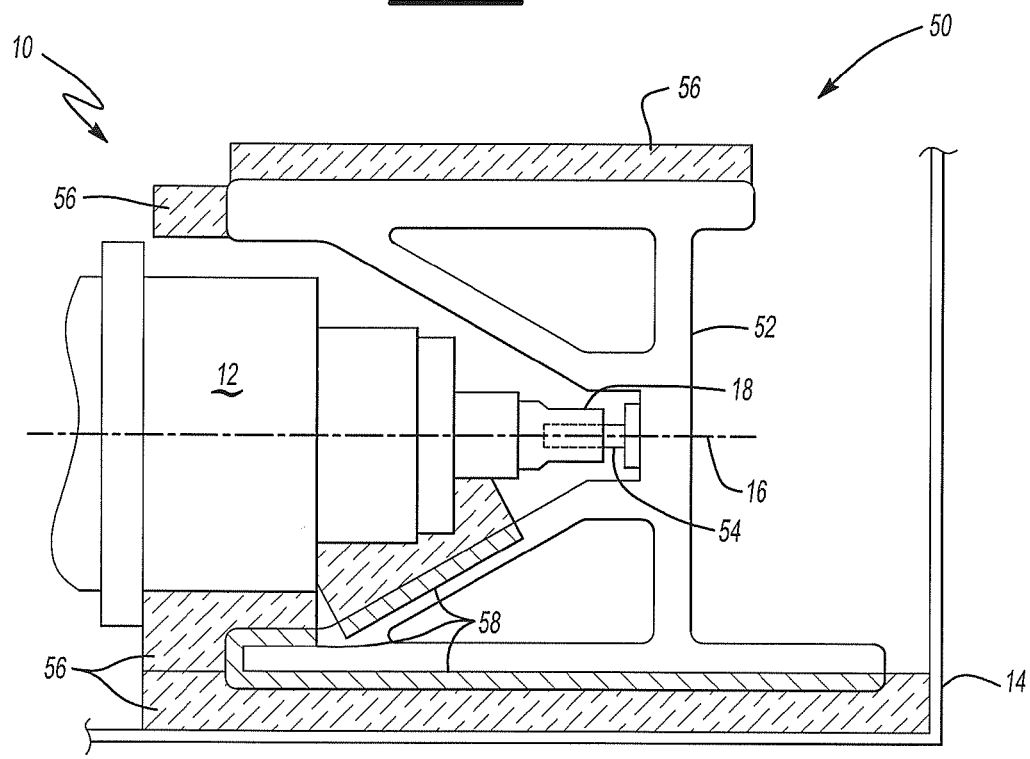
FIG. 3 is a side view of a second embodiment of the cleaning apparatus mounted on the spindle.

Referring to FIG. 3, another embodiment of a cleaning apparatus is shown. In this embodiment, the cleaning apparatus 50 includes a support plate 52, a second coupling member 54, and a cleaning member configured as a wiper 56.

The wiper 56 may be made of any suitable material, such as rubber, nylon, spring steel, or a polymeric material like ultrahigh molecular weight polypropylene (UHMW-PP). One or more wipers may be employed. If multiple wipers are used, the wipers may have different heights and/or different tip designs. For example, the tip of the wiper 56 may be flat, angled, pointed, or rounded.

The wiper 56 may be mounted to the cleaning apparatus 50 in any suitable manner and with any suitable orientation. For example, the wiper 56 may be inserted into a slot in the support plate 52 or attached with a mounting block 58 as shown in FIG. 3. The wiper 56 may also be attached with adhesives, fasteners, or by sonic welding. Optionally, the wiper 56 and/or mounting block 58 may be spring loaded or mounted on a flexible member to allow the wiper 56 to follow the contour of the contacted surface. In addition, the wiper 56 may be attached to a rod (not shown) that is extendible from the support plate 22.

Figure 4:
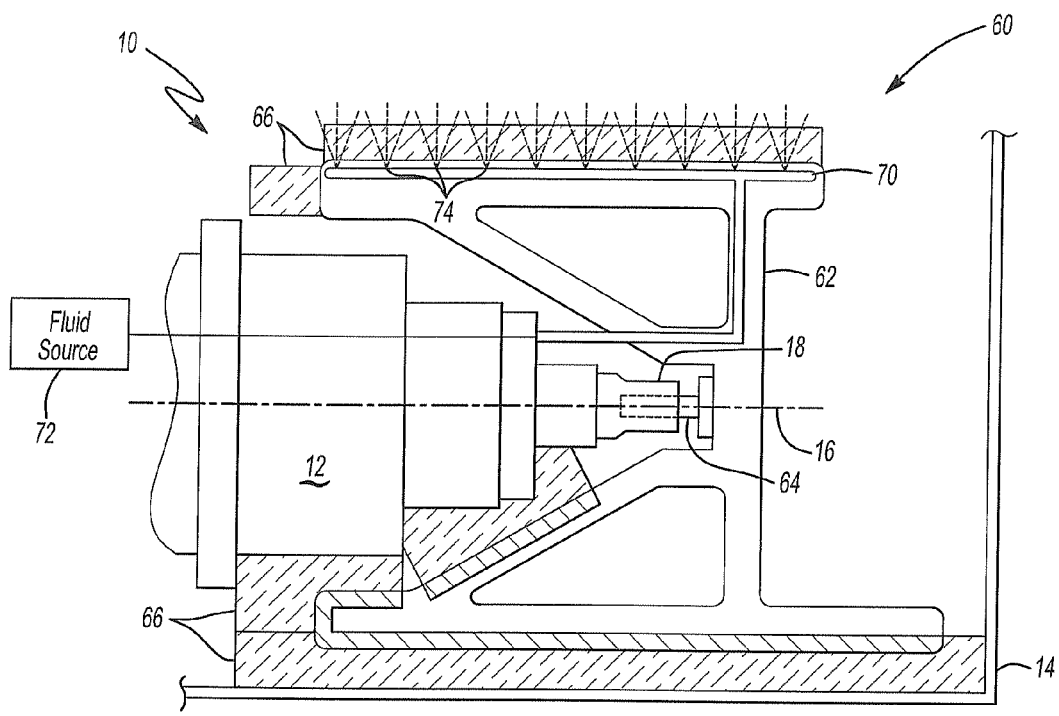
FIG. 4 is a side view of a third embodiment of the cleaning apparatus mounted on the spindle.

Referring to FIG. 4, another embodiment of the cleaning apparatus is shown. In this embodiment, the cleaning apparatus 60 includes a support member 62, a second coupling member 64, a wiper 66, and a conduit 70. The conduit 70 may disposed in the support member 62 or may be attached to the support member 62 in any suitable location or manner, such as with fasteners.

The conduit 70 provides a pressurized fluid, such as coolant or air, or any other suitable substance, such as carbon dioxide ($CO_2$) pellets or granulated matter, to help dislodge and remove contaminants from the machine tool 10 and/or cleaning apparatus 60. The conduit 70 may be connected to a source of pressurized fluid 72 via an intermediate passage located in the spindle and/or first coupling member 18.

The conduit 70 also includes one or more apertures 74 that direct the pressurized fluid toward the machine tool 10 and/or the cleaning apparatus 60. Optionally, the apertures 74 may include fixed or flexible nozzles.

Figure 5:
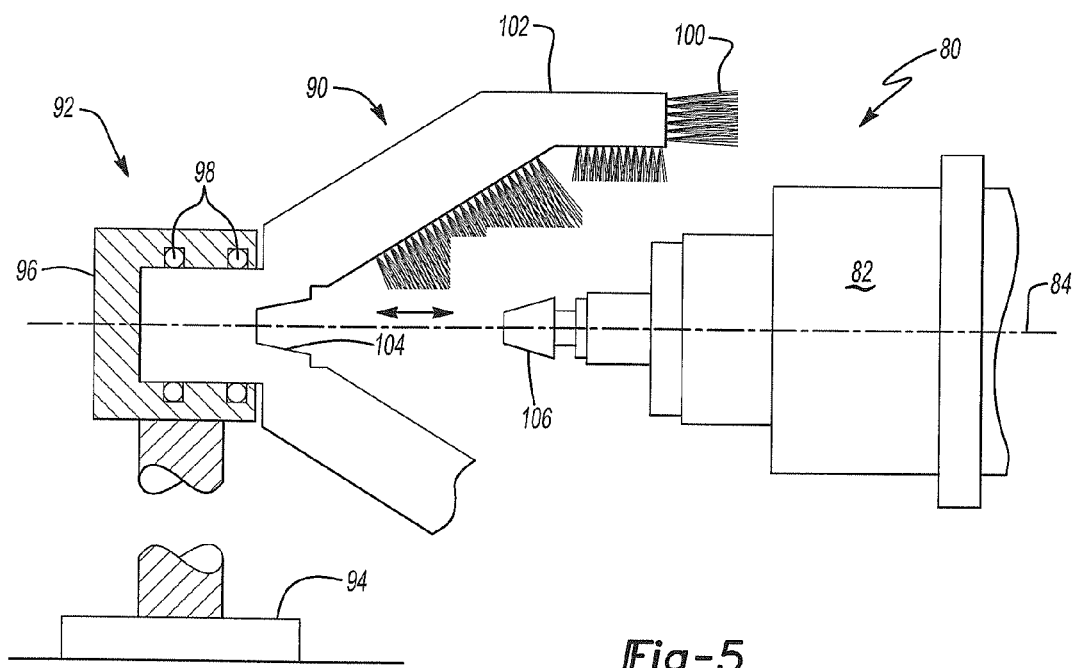
FIG. 5 is a side view of a fourth embodiment of the cleaning apparatus mounted on a fixture.

Referring to FIG. 5, a fourth embodiment of the invention is shown. In this embodiment, the machine tool 80 includes a spindle 82 that is rotatable and positionable along an axis of rotation 84 as previously described.

A cleaning apparatus 90 is rotatably mounted on a fixture 92. The fixture 92 includes a mounting plate 94 for securing the cleaning apparatus 90 in a fixed position relative to the spindle 82. More specifically, the mounting plate 94 may be attached to the machine tool 80, a robot, a pallet, or a tool change mechanism, such as an automated tool changer. The fixture 92 also includes a bearing block 96 connected to the mounting plate 94. The bearing block 96 includes one or more bearings 98 that rotatably support the cleaning apparatus 90.

The cleaning apparatus 90 includes one or more cleaning members 100 attached to a support plate 102 as previously described. The cleaning apparatus 90 also includes a first coupling member 104. In the embodiment shown in FIG. 5, the first coupling member 104 is configured as a conical female friction coupling.

A second coupling 106 is disposed on the spindle 82 as previously described. The first and second couplings 104, 106 may be of a any suitable type, and are configured to engage each other when the spindle 82 is advanced along the axis of rotation 84 in the direction denoted by the horizontal arrow. In the embodiment shown in FIG. 5, at least one cleaning member 100 contacts the spindle 82 when the couplings 104, 106 are engaged. The spindle 82 can turn the cleaning apparatus 90 about the axis of rotation 84 to remove contaminants. Optionally, the cleaning apparatus 90 may be turned or aided by suitable pneumatics or hydraulics.

Referring again to FIG. 1, a method for removing contaminants from a machine tool with a cleaning apparatus will now be described. Although the method is described with reference to the cleaning apparatus shown in FIG. 1, any cleaning apparatus embodiment can be employed.

In one embodiment of the method, the cleaning apparatus 20 is turned about the axis of rotation 16 to dislodge contaminants from the spindle 12 and/or housing 14 in accordance with the following steps.

First, the cleaning apparatus 20 and the spindle 12 are coupled together by engaging the first and second coupling members 18, 24 as previously described.

Second, the spindle 12 rotates the cleaning apparatus 20 about the axis of rotation 16. As the cleaning apparatus 20 is rotated, the cleaning members 26 contact the exterior surface of the spindle 12 and may contact at least a portion of the housing 14 or surface to be cleaned to dislodge contaminants.

The spindle 12 may be rotated at a constant rotational speed or multiple rotational speeds. In addition, the spindle 12 may be "pulsed" to alter the rotational speed. The spindle 12 may rotate in different directions. For example, the spindle may alternate between clockwise and counterclockwise directions to scrub contaminants off surfaces of the machine tool. Optionally, the position of the spindle may be "pulsed" along an axis, such as the X, Y, and/or Z axes shown in FIG. 1.

With continued reference to FIG. 1, another embodiment of a method for cleaning a machine tool with a cleaning apparatus will now be described.

First, the cleaning apparatus 20 is coupled to the spindle 12 as previously described.

Second, the spindle 12 is rotated about the axis of rotation 16 to position the cleaning apparatus 20 at a predetermined position or angle.

Third, the spindle 12 is locked to prevent the spindle 12 and cleaning apparatus 20 from rotating about the axis of rotation 16.

Fourth, the cleaning member 20 is moved along an axis perpendicular or parallel to the axis of rotation 16. In the embodiment shown in FIG. 1, the cleaning member 20 may be moved along the X axis or Y axis to position the cleaning apparatus 20, and more particularly the cleaning member 26, in contact with an interior surface of the housing 14. For example, the spindle 12 or cleaning member 20 may be moved along the X axis to position the cleaning member 26 in contact with the left or right side of the housing 14 or along the Y axis to position the cleaning member 26 in contact with the top or bottom of the housing 14.

Fifth, the cleaning apparatus 20 is moved along another axis to remove contaminants. For example, if the cleaning apparatus 20 was previously moved along the X axis (i.e., the cleaning member 26 contacts the left or right side of the housing 14), the cleaning apparatus 20 may now be moved along the Y axis to push or pull the cleaning member 26 along an interior surface of the housing 14. As the cleaning member 26 is moved across the interior surface of the housing 14, contaminants are scraped or dislodged. Similarly, the cleaning apparatus 20 may be moved along the X axis to scrap or dislodge contaminants from the top or bottom surface of the housing 14. In this manner, the cleaning apparatus 20 effectively removes contaminants from hard-to-reach places, such as corners of the housing 14.

While the best mode for carrying out the invention has been described in detail, those familiar with the art to which this invention relates will recognize various alternative designs and embodiments for practicing the invention as defined by the following claims.

The invention claimed is:

1. A system for dislodging contaminants, the system comprising:
   a machine tool having a spindle adapted to turn about an axis of rotation and a housing disposed around and spaced apart from the spindle;
   a support plate;
   a rigid arbor fixedly disposed on the support plate and attached to the spindle; and
   first and second cleaning members disposed on and extending from the support plate;
   wherein the first cleaning member contacts an interior surface of the housing to remove contaminates from the interior surface and the second cleaning member contacts the spindle to remove contaminants from the spindle when the rigid arbor is attached to the spindle.

2. The system of claim 1 wherein the cleaning member is a plurality of flexible bristles.

3. The system of claim 1 wherein the cleaning member is a flexible wiper.

4. The system of claim 1 wherein the cleaning member is disposed along an inside edge of the support plate for cleaning an exterior surface of the spindle when the apparatus is rotated about the axis of rotation by the spindle.

5. The system of claim 1 wherein the cleaning member is disposed along an outside edge of the support plate for cleaning an interior surface of the housing when the cleaning member contacts the interior surface.

6. The system of claim 1 wherein the cleaning member is disposed radially about the axis of rotation.

7. The system of claim 1 wherein the cleaning member is disposed at an angle relative to the support plate.

8. The system of claim 1 further comprising a conduit disposed on the support plate, the conduit having an end connected to a source of pressurized fluid and an aperture for discharging the pressurized fluid toward the machine tool to remove contaminants.

9. The system of claim 1 wherein the machine tool is computer numerically controlled (CNC) machine tool.

10. The system of claim 1 wherein the machine tool is configured to move the spindle along a plurality of rectilinear axes.

11. The system of claim 1 wherein the housing is disposed completely around at least a portion of the spindle.

12. The system of claim 1 wherein the support plate is asymmetrically disposed around the axis of rotation.

13. The system of claim 12 wherein the support plate has a plurality of openings to reduce rotational inertia of the cleaning apparatus.

14. An apparatus for dislodging surface contaminants from a machine tool, the machine tool having a spindle adapted to turn about an axis of rotation and a housing disposed around and spaced apart from the spindle, the apparatus comprising:
   a fixture disposed within the housing and having a mounting plate for securing the fixture to the machine tool in a stationary position, the fixture further including a bearing block connected to the mounting plate;
   a support plate rotatably mounted on the fixture via the bearing block;
   a first coupling member disposed on the support plate, the first coupling member adapted to engage a second coupling member disposed on the spindle; and
   a cleaning member disposed on and extending from the support plate;
   wherein when the first and second coupling members are engaged the spindle rotates the support plate about the axis of rotation and the cleaning member contacts a surface of the machine tool to remove contaminates.

15. The apparatus of claim 14 wherein the cleaning member is disposed along an inside edge of the support plate for cleaning an exterior surface of the spindle when the apparatus is rotated about the axis of rotation.

16. The apparatus of claim 14 wherein the cleaning member is a plurality of flexible bristles.

17. The apparatus of claim 14 wherein the cleaning member is a flexible wiper.

18. The apparatus of claim 14 wherein the cleaning member is disposed radially about the axis of rotation.

19. The apparatus of claim 14 wherein the cleaning member is disposed at an angle relative to the support plate.

20. The apparatus of claim 14 further comprising a conduit disposed on the support plate, the conduit end connected to a source of pressurized fluid and an aperture for discharging the pressurized fluid toward the machine tool to remove contaminants.

* * * * *